United States Patent

[11] 3,612,132

| [72] | Inventor | Masato Tsutsumi |
| | | Kahului, Hawaii |
| [21] | Appl. No. | 888,532 |
| [22] | Filed | Dec. 29, 1969 |
| [45] | Patented | Oct. 12, 1971 |
| [73] | Assignee | Maui Land & Pineapple Company, Inc. |
| | | Kahului, Maui, Hawaii |

[54] METHOD AND APPARATUS FOR DECROWNING PINEAPPLES
8 Claims, 5 Drawing Figs.

[52] U.S. Cl. .................................................. 146/237,
146/6, 146/238, 146/55
[51] Int. Cl. ............................................. A23n 15/04
[50] Field of Search .......................................... 146/6, 55,
226, 237, 238

[56] References Cited
UNITED STATES PATENTS
| 2,486,367 | 10/1949 | Abrey et al. .................. | 146/6 X |
| 2,530,201 | 11/1950 | Jagenburg ..................... | 146/6 |
| 3,176,739 | 4/1965 | Minera ........................ | 146/55 X |

Primary Examiner—Willie G. Abercrombie
Attorney—Lyon & Lyon

ABSTRACT: A method and apparatus for removing the crown from a pineapple by placing the pineapple on a convoluted conveyor belt so as to space each piece of fruit from another, transferring the spaced fruit on a second softly matted conveyor belt traveling in the same direction as the convoluted belt, bringing the top portion of the fruit into contact with a third soft weighted matted member suspended directly above the second matted conveyor belt. This top matted member imparts a spin or twist to the fruit in a direction opposite to their direction of travel. A pair of conveyors running parallel to the second conveyor to receive the crown and stop its rotation while the fruit is still rotating thus twisting the crown off from the fruit.

PATENTED OCT 12 1971

INVENTOR
MASATO TSUTSUMI
BY Lyon & Lyon
ATTORNEYS

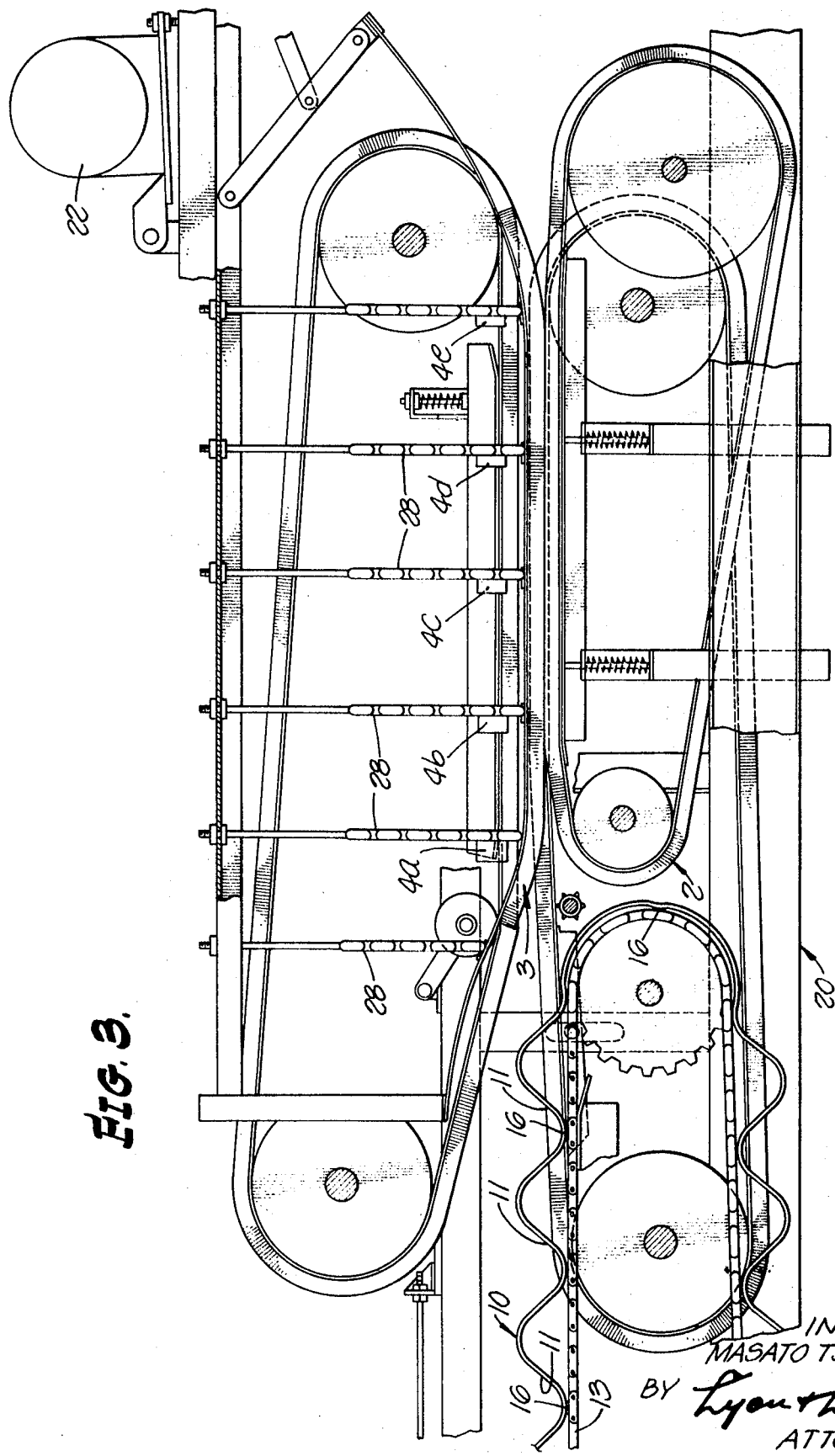

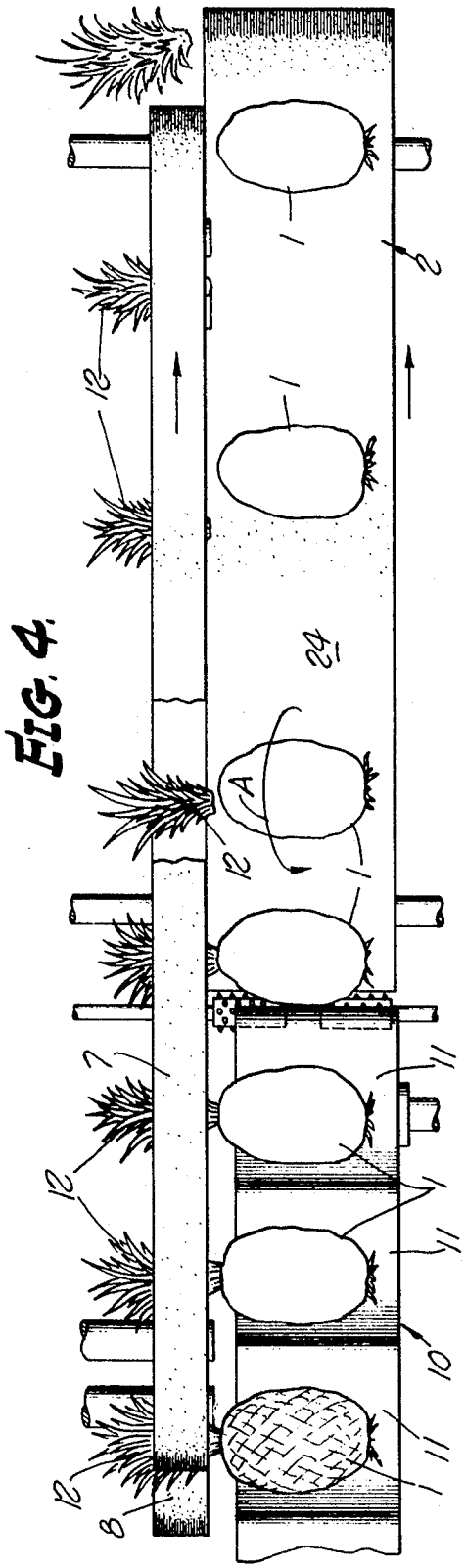
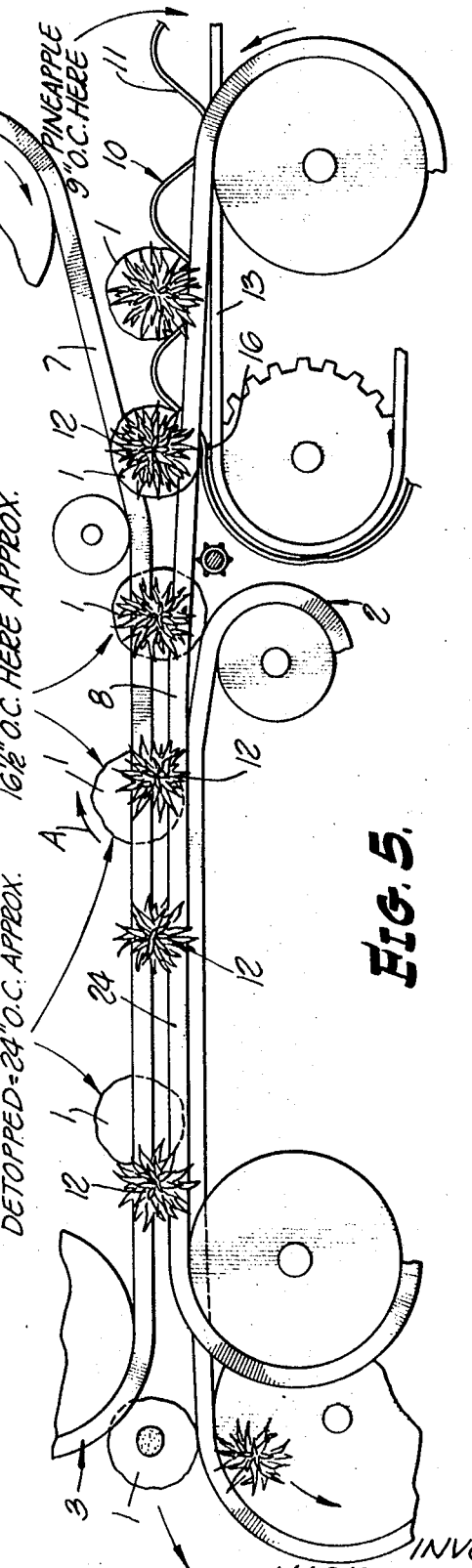

3,612,132

METHOD AND APPARATUS FOR DECROWNING PINEAPPLES

BACKGROUND OF THE INVENTION

At pineapple harvest time the past practice was to have a crew of six to twelve men follow along behind a harvester-conveyor machine, walking between the rows. Each man would select the ripened fruit and snap off the crown and place the fruit on the conveyor which would deliver the fruit to a bin on the truck.

This practice had its drawbacks in that it was time consuming and could and did distract the picker's attention from the field thus allowing for ripened fruit to be bypassed and pineapples must be picked when they are exactly ripe.

Another drawback is that a mother pineapple plant only produces one pineapple, and second, pineapples are produced from what is called a ratoon crop. After this crop, it is necessary to replant the entire field and as a pineapple bears no seeds, the crowns, as well as some slips and suckers, are used to plant these new fields. The seed materials were gathered manually at planting time.

The principle object of the present invention is to provide a means of separating the pineapple bodies from the crowns so that the best crowns may be replanted and the pineapple canned.

A further object is to provide a means for continually decrowning pineapples in such a manner so as to produce a minimum of damage to either the pineapple or the crowns.

A still further object of the present invention is to provide a means which effect separation of the crown from the pineapple without separating the crown segments.

A still further object of the present invention is to provide a means for decrowning pineapples which saves picking time in the field thus preventing pickers from bypassing the ripe fruit in the field.

Further objects and advantages of the present invention will become apparent from the description of the invention and the drawings.

DESCRIPTION OF THE DRAWINGS

FIG. 3 is an enlargement of FIG. 1 illustrating the decrowning portion of the machine.

FIG. 4 is a plan view showing fruit being fed onto and between the belts and being decrowned.

FIG. 5 is a partial side view illustrating how the tops are secured between the belts and twisted off.

DESCRIPTION OF THE INVENTION

THE METHOD

Figure 1:
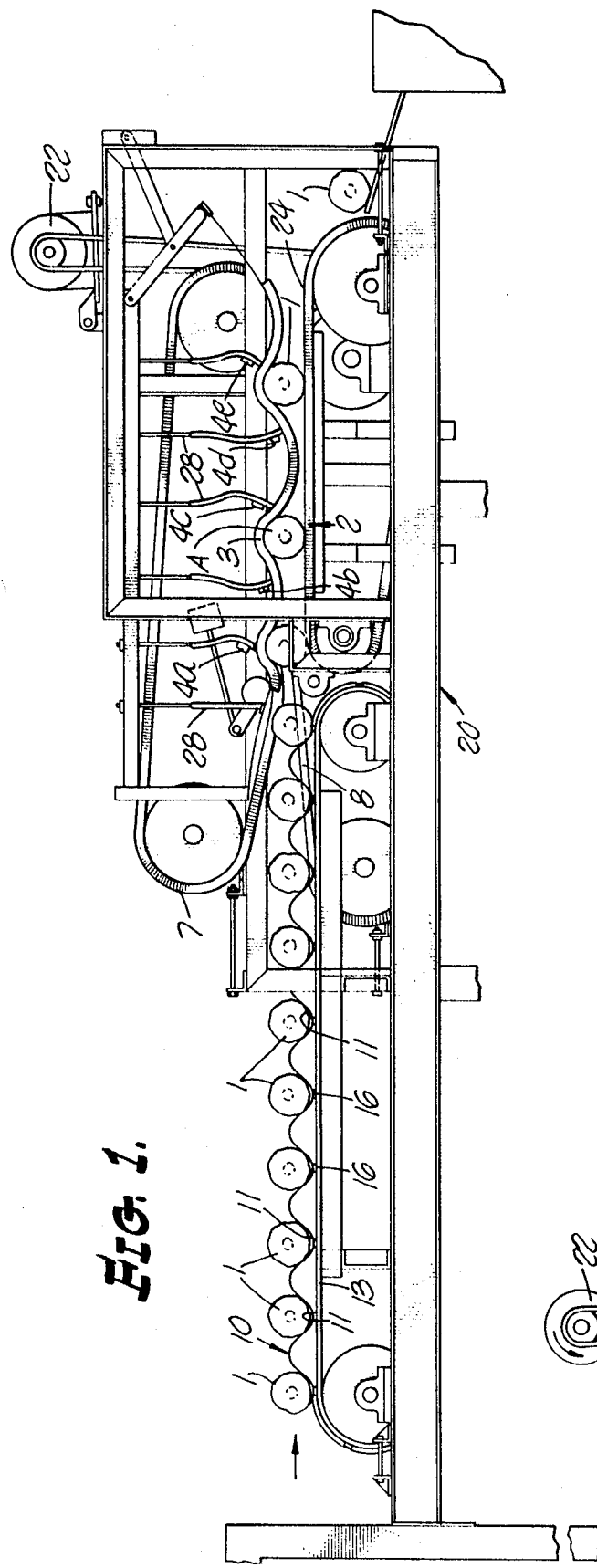
FIG. 1 is a side elevation showing the fruit on the conveyor in the process of being decrowned.

Referring to the drawings, in particular FIGS. 1 and 3, pineapples 1 are placed in convolutions 11 on belt 10 which spaces the pineapples apart from each other and orients the crowns 12 in the machine. These convolutions 11 are formed by spacing the belt 10 along and above its drive chain 13. From this belt the pineapples 1 are delivered in their spaced relationship to a scrubber matted belt 2 traveling in the same direction as convoluted belt 10. Above belt 2 is a weight scrubber mat 3. The associated weight of this mat 3 and weights 4 cause a drag on the tops of the pineapples 1. As scrubber matted belt 2 progresses a roll is imparted to pineapples 1 in a direction opposite to that of the travel of belt 2 as indicated by arrow A of FIGS. 1 and 5.

A second pair of belts 7 and 8 are located alongside belt 2. These belts first receive the crown portion 12 of the fruit as its thickest area which is closest to the top of the pineapple. These belts then come together to firmly grasp crown 12. This grasping action combined with the rolling action of the pineapple causes the pineapples to be wrenched from the crown.

THE APPARATUS

Figure 2:
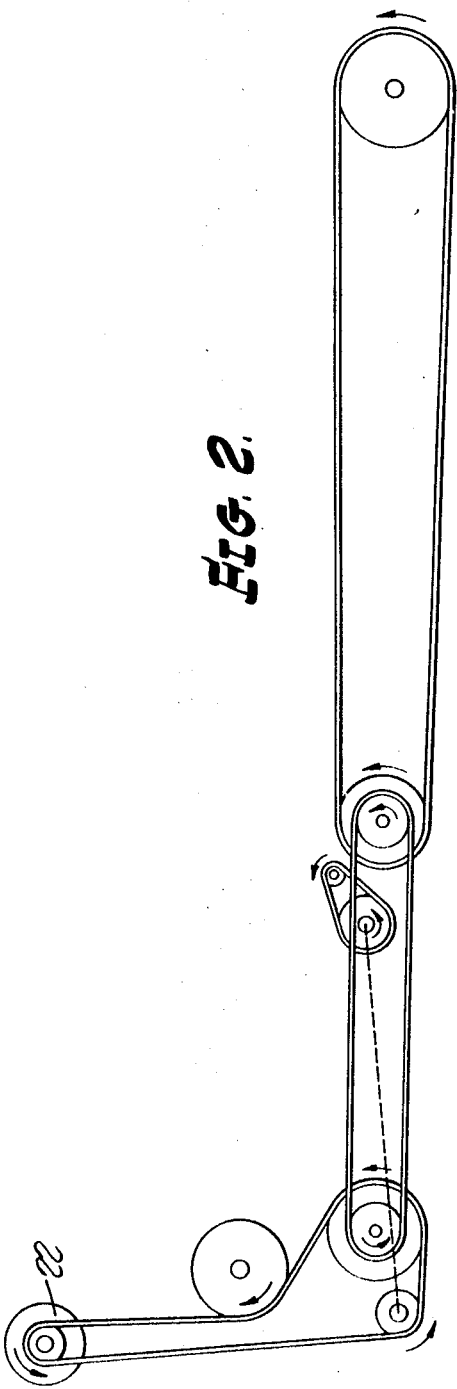
FIG. 2 is a schematic illustration of the drive system.

The apparatus which performs the above-described method consists essentially of a frame generally designated as 20 which supports a motor 22 for driving the drive system shown by FIG. 2. The drive system of FIG. 2 is made up of a series of conventional belts or chains arranged to power the system through one motor in a time sequence.

The convolutions 11 in belt 10 are formed by spacing the attaching blocks 16 along drive chain 13 so that these convolutions 11 provide an evenly spaced series of pineapples to be delivered to the next belt 2. This second belt 2 is traveling at a much faster speed than the convoluted belt 10 and is formed of a thickly matted surface 24 which separates the pineapples 1 in their spaced relationship and at the same time provides a soft matted surface for the pineapples to rest on.

Another scrubber mat 3 has a similar surface 26 to that of belt 2 and is suspended above this belt by flexible arms 28. The mat 3 is weighted down toward matted belt 2 by weights 4 which provide enough resistance to the traveling to stop the travel of the top portion of the pineapple and impart a rearward spin or slow roll to the fruit.

The approximate weight of these weights 4 are 10 lbs. 6 oz. for 4a, 8 lbs. for 4b, 7 lbs. for 4c, 6 lbs. 6 oz. for 4d and 4e. The reason for lightening the weights as the fruit progresses along this belt are two fold. First, less weight is needed to hold the fruit after the crown has been removed and more weight is needed to impart the roll of the fruit than is required to maintain this roll. Second, the lessening of the weight and interaction of the belt helps the individual pineapples to roll away from each other becoming progressively further apart as they travel along belt 2. An object also is to use the minimum amount of weight to prevent bruising or otherwise damaging the fruit.

Referring now to FIGS. 4 and 5, belts 7 and 8 travel parallel to belts 11 and matted scrubber belt 2. These belts 7 and 8 proceed to come together as the fruit 1 reaches the belt 2 grasping the crown 12 of the fruit near to the top of the fruit. This belt is traveling at a slower speed than belt 2 and firmly holds the crown so that when the roll is initiated by the mat 3, the pineapple is wrenched from the crown.

Various changes and modifications may be made in carrying out the present invention without departing from the scope and spirit thereof. Insofar as these changes and modifications are within the purview of the appended claims, they are to be considered as part of the invention.

I claim:

1. A method for removing the crowns from pineapples comprising:
    conveying the pineapples bearing the crowns along a conveyor belt;
    bringing the tops of the conveyed pineapples with the crowns into contact with a means which resists the direction of conveyance thereby imparting a rotation to said pineapples while at the same time bringing the crowns of the pineapples into contact with a pair of conveyor members which resist said rotation of the pineapple crowns thereby wrenching said pineapples from said crowns.

2. The method of claim 1 wherein said pineapples are conveyed in an advancing spaced relationship, the beginning of which is predetermined, to prevent bruising of said pineapples by contact between pineapples.

3. The method of claim 1 wherein the direction of rotation of said pineapples is opposite to that of conveyance.

4. An apparatus for removing the crowns from pineapples with a frame, a motor and associated drive mechanisms, comprising:
    a first belt upon which the pineapples are placed in a spaced relationship;
    said first belt delivering said pineapples to a second belt;
    means suspended above said second belt which causes said pineapples to rotate;

a plurality of belts traveling parallel to said second belt which engage the crowns of said pineapples and resist the rotation of said crowns and cause the pineapple to be wrenched from their crowns.

5. The apparatus of claim 4 wherein said first belt is convoluted to provide for a predetermined spacing of said pineapples.

6. The apparatus of claim 4 wherein said second belt comprises a soft matted scrubber belt to prevent bruising of said pineapples.

7. The apparatus of claim 4 wherein means suspended above said second belt comprises a soft matted scrubber belt weighted down onto the conveyed pineapples.

8. The apparatus of claim 4 wherein said belts traveling parallel to said second belt are in a paired relationship to receive the crowns and are traveling at a speed faster to that of said second belt.